March 18, 1924.                                           1,487,091
                         F. DAY
                        FLYTRAP
                   Filed Feb. 16, 1922
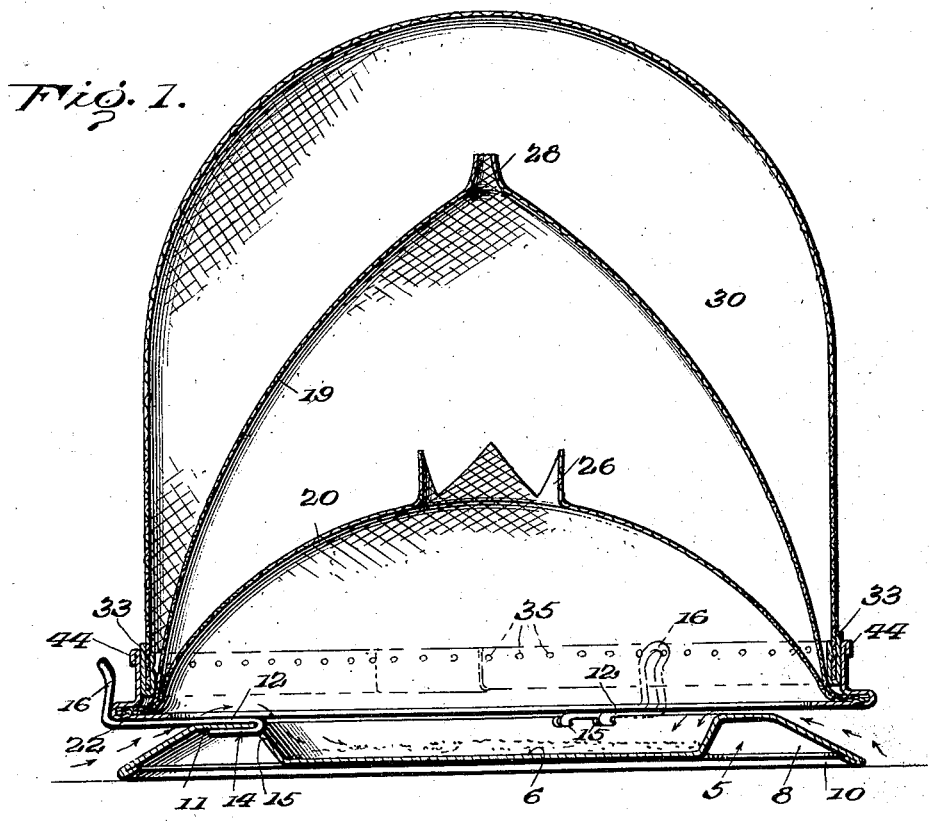
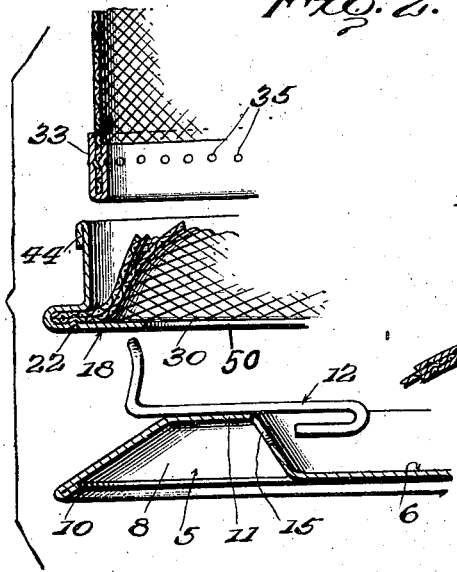
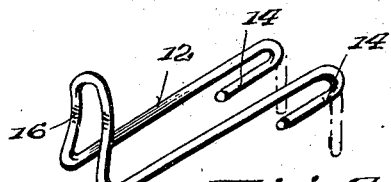
INVENTOR
Fred Day Patented Mar. 18, 1924.

1,487,091

UNITED STATES PATENT OFFICE.

FRED DAY, OF ALCESTER, SOUTH DAKOTA.

FLYTRAP.

Application filed February 16, 1922. Serial No. 536,969.

*To all whom it may concern:*

Be it known that I, FRED DAY, a citizen of the United States, residing at Alcester, in the county of Union and State of South Dakota, have invented certain new and useful Improvements in Flytraps, of which the following is a specification.

This invention relates to traps especially adapted for use in connection with flies.

An important object of this invention is to provide a fly trap having novel means whereby the flies are caused to pass through a plurality of trapping domes and prevented from escaping so that the flies are caused to die from lack of nourishment.

Further the invention aims to provide a fly trap embodying a novel form of dome which may be conveniently detached when it is desired to remove the dead flies.

Also the invention aims to provide a fly trap of the class described which is of highly simplified construction, durable in use and cheap to manufacture.

Other objects and advantages of the invention will be apparent during the course of the following description.

In the accompanying drawing forming a part of this application and in which like numerals are employed to designate like parts throughout the same, Figure 1 is a vertical sectional view through the improved trap.

Figure 2 is a detail sectional view illustrating the means for connecting the various sections of the trap.

Figure 3 is a perspective of a supporting arm embodied in the invention.

Figure 4 is a fragmentary plan view of the rim of the dome, parts being shown in section to illustrate the means for connecting the reticulated body of the dome to the rim.

In the drawing wherein for the purpose of illustration is shown a preferred embodiment of the invention the numeral 5 generally designates a poison containing or bait containing pan having its central portion recessed as indicated at 6 to define a container adapted for the reception of the bait which is preferably in a liquid state. The other edge portion of the pan 5 is extended downwardly as indicated at 8 so that the recessed portion 6 will be disposed above the level of the table or other supporting surface. To provide a smooth edge, the outer edge portion of the pan is extended inwardly as indicated at 10.

The raised rim portion 11 of the pan constitutes a supporting means for a suitable number of arms generally designated by the numeral 12 and which are shown in detail in Figures 2 and 3. With reference to Figure 3 it will be seen that each supporting arm 12 is of U-shaped formation and consists of spaced parallel sides having their terminal portions bent upon themselves as indicated at 14 to provide attaching members adapted for insertion through apertures 15 in the inclined sides of the pan. As illustrated in Figure 1 the attaching fingers 14 flatly contact with the under sides of the pan while the spaced parallel arms flatly contact with the top of the pan for holding the arms in position.

The outer portions of the arms are extended upwardly and inwardly as indicated at 16 so as to act as a retaining means for the base 18 of a pair of trapping screens.

As illustrated in Figure 2 the base 18 is of channel-shaped formation and is provided with upper and lower sides between which the lower terminal portions of the trapping sections 19 and 20 are arranged. After the trapping sections 19 and 20 are thus arranged between the upper and lower sides of the base 18 as illustrated in Fig. 2 the lower side of the base is punched inwardly as indicated at 22 so as to provide a plurality of knobs which engage the reticulated edge portions of the trapping sections 19 and 20 whereby to securely and positively connect the ends of the trapping sections to the base. The indentations 22 not only connect the trapping sections 19 and 20 to the base 18 but also securely connect the lower portion of the trapping section 19 to the lower portion of the inner trapping section 20 so that flies are prevented from escaping between the sections.

As illustrated in Figure 1 the upper portion of the reticulated trapping section 20 is formed with a plurality of radial incisions which define partly severed portions bent upwardly to provide tapering baffle elements 26 which prevent flies from returning through the opening formed by extending the prongs upwardly. It will be seen that as the flies crawl upwardly within the trapping section 20 they will pass through the opening in the top of the same and will be prevented to some extent in returning by way of the opening because of the upwardly extending portions 26.

The outer trapping section 19 is extended a substantial distance above the inner trapping section 20 and has its upper portion formed with a gradually tapered outlet 28 through which flies pass in seeking the light. Of course the flies are prevented from escaping by moving downwardly within the trapping section 19 as the lower portion of the trapping section 19 is securely connected to the section 20.

As the flies pass through the gradually reduced outlet 28 they enter a dome 30 which constitutes a final receiver for the flies. When the flies enter the dome 30 they are prevented from escaping and die as a result of lack of nourishment.

The lower portion of the reticulated dome 30 is provided with a rim 33 having inner and outer metallic sides which define a channel into which the lower portion of the reticulated body is extended. With particular reference to Figure 2 it will be observed that the inner side of the rim 33 is formed with indentations 35 which define outwardly extending projections to engage the lower portion of the reticulated dome and thereby securely connect the dome to the rim.

As illustrated in Figure 2 the ends of the rim are overlapped and are connected by the outwardly extending projections formed by the indentations 35. Also the outer side of the rim 33 is formed with indentations to correspond to the indentations in the inner side of the rim and to receive portions of the body 30.

Also the base 18 is overlapped at its ends and the ends are connected by the projections formed by the indentations 22.

In preparing the device for use suitable bait is placed within the recess portion 6 of the pan and the inner and outer trapping sections 19 and 20 are subsequently placed in position. The base 18 is flatly mounted on the arms 12 and is held in position by the inwardly extending portions of the upstanding sides of the arms. That is to say that portion 16 of each arm yieldably holds the base 18 against upward movement.

The dome 30 is now placed in position by inserting the rim 33 within the annulus 44 formed by extending the upper side of the base 18 upwardly. The rim 33 is snugly received within the annulus 44 whereby to connect the dome to the base as illustrated in Figure 1. The device is now ready for use and flies seeking to gain access to the bait pass between the base and the raised portion of the pan. The flies will now move upwardly through the openings in the top of the sections 19 and 20 and will enter the dome 30 where they are trapped. Should one of the flies crawl downwardly on the reticulated trapping section 20 it will be confronted by the inwardly extending portion of the bottom of the base 18. As illustrated in Figure 2 the lower side of the base 18 is extended beyond the upper side of the base for a substantial distance so as to provide an annular baffle which prevents the flies from passing out of the trapping sections. Upon reaching the inwardly extending annular baffle which for the purpose of clearness is designated by the numeral 50 the flies will move inwardly and will be given another opportunity to pass through the opening in the top of the trapping section. When the dome 30 is filled or partially filled it may be detached and the contents of the same discharged. The device may be readily and conveniently cleaned as the several parts may be easily separated and owing to the construction illustrated the easy escape of flies is prevented.

Attention is directed to Figure 1 wherein the rim portion of the pan is inclined downwardly to contact with the supporting surface so that the flies may crawl from the supporting surface into the trap by way of the incline. Also by inclining the edge portions of the pan a gradually restricted entrance opening is provided.

Having thus described the invention what I claim is:—

1. A trap comprising a bait receiving pan, a plurality of radially extending arms carried thereby, a base member of annular formation mounted on said arms and having upper and lower sides arranged in spaced relation, inner and outer trapping sections having their lower portions arranged between said upper and lower sides, the lower side of said base being provided with projections engaging the lower portions of said trapping sections, the lower side of said base being extended inwardly for a substantial distance beyond the upper side of the base, thereby to define an annular baffle.

2. A trap comprising a bait receiving pan, a plurality of radially extending arms carried thereby, a base member of annular formation mounted on said arms and having upper and lower sides arranged in spaced relation, inner and outer trapping sections having their lower portions arranged between said upper and lower sides, the lower side of said base being provided with projections engaging the lower portions of said trapping sections, the lower side of said base being extended inwardly for a substantial distance beyond the upper side of the base, thereby to define an annular baffle, and a dome extending over said trapping section and having a rim engaged with the outer trapping section.

3. A trap comprising a bait receiving pan, a plurality of radially extending arms carried thereby, a base member of annular formation mounted on said arms and having upper and lower sides arranged in spaced relation, inner and outer trapping sections having their lower portions arranged between said upper and lower sides, the lower side of said base being provided with projections engaging the lower portions of said trapping sections, the lower side of said base being extended inwardly for a substantial distance beyond the upper side of the base, thereby to define an annular baffle, a dome extending over said trapping section and having a rim engaged with the outer trapping section, the uper side of said base being extended upwardly whereby to provide an annular flange to snugly receive the rim of said dome.

4. A trap comprising a bait receiving pan, a plurality of radially extending arms carried thereby, a base member of annular formation mounted on said arms and having upper and lower sides arranged in spaced relation, inner and outer trapping sections having their lower portions arranged between said upper and lower sides, the lower side of said base being provided with projections engaging the lower portions of said trapping sections, the lower side of said base being extended inwardly for a substantial distance beyond the upper side of the base, thereby to define an annular baffle, and a dome extending over said trapping section and having a rim engaged with the outer trapping section, the edge portion of said pan being inclined and engaged with the supporting surface and cooperating with said annular baffle in providing a gradually restricted entrance opening.

5. A fly trap comprising a reticulated body, a rim of channel-shaped formation having spaced sides between which the lower portion of the dome body is arranged, one of the sides of said rim being formed with indentations defining projections to engage said body whereby to hold the same in position, the ends of said rim being overlapped and held in position by said indentations.

6. A fly trap comprising a pan, having the edge portion inclined and the central portion recessed for the reception of bait, a plurality of arms connected to said pan and extending outwardly therefrom, said arms being provided with upwardly and inwardly extending portions constituting a retaining means, a base mounted on said arms and held in position by said retaining means, inner and outer reticulated trapping sections connected to said base, said base being provided with an upwardly extending annular flange, and a dome having a rim snugly received within said annular flange, said base being provided with an inwardly extending baffle constituting a means to direct the flies inwardly and cooperating with the inclined edge portion of said pan in defining a gradually restricted entrance opening.

In testimony whereof, I have affixed my signature in the presence of two witnesess.

FRED DAY.

Witnesses:
CHARLEY W. PETERSON,
EMIL JOHNSON.